Patented Oct. 31, 1950

2,528,390

UNITED STATES PATENT OFFICE 2,528,390

WRITING INKS

Galen H. Sayler, Janesville, Wis., assignor to The Parker Pen Company, Janesville, Wis., a corporation of Wisconsin No Drawing. Application March 13, 1948, Serial No. 14,812

8 Claims. (Cl. 106—22)

This invention relates to writing inks and has to do particularly with writing inks which are compatible with pen structural materials and do not cause deterioration thereof.

Many types of fountain pens have a portion or portions from rubber, as for example in some types the ink reservoir is formed at least in part by a rubber sac and in other types a filling diaphragm is employed which is formed from rubber. It has been found that many otherwise highly desirable inks cause deterioration of rubber, and therefore shorten the life of fountain pens having rubber parts. It has been found that deterioration of rubber by inks is especially rapid where the inks contain as the dye component a copper compound. It also has been found that deterioration of the rubber portions of fountain pens is caused by inks which do not contain a copper compound but which inks have been found to contain traces of copper as an impurity. It is well known that copper and its compounds are active catalyzers of deterioration of rubber due to oxidation, even where well known anti-oxidants are incorporated in the rubber. It is believed, therefore, that the deterioration of rubber by inks which has been noted is due to the catalytic action of free copper in the ink and perhaps also due to copper compounds in the ink. Since it is very difficult to insure that copper or copper compounds may not be present in ink, it is desirable to inhibit the catalytic action of copper in inks. Moreover, since many copper compound dyes have excellent properties for use in inks, except for the tendency to deteriorate the rubber portions of fountain pens, it is especially desirable to provide for inhibiting such deterioration action.

An object of my invention is to provide a writing ink which does not cause deterioration of rubber and which therefore is suitable for use in all types of pens, including fountain pens of the types which have a portion or portions formed from rubber.

Another object is to provide an ink containing as a dye a copper compound and which ink does not cause deterioration of rubber.

A further object is to provide a writing ink having the property of inhibiting copper-induced catalytic deterioration of rubber.

In accordance with my invention I provide an ink which, although it may contain a copper compound dye or traces of copper as an impurity, nevertheless, does not deteriorate to any appreciable extent any portion of a pen and particularly those parts which are formed from rubber. To this end, I include as an ingredient of the ink a material (herein called a "copper inhibitor") which is effective to retard or entirely prevent copper-induced catalytic deterioration of any rubber material with which the ink comes in contact, as for example, the rubber sac or filling diaphragm of a fountain pen. The copper inhibitor is a material which is capable of being dissolved, or highly dispersed in the ink, and which is compatible with the other ingredients of the ink and the pen structural materials. Excellent results have been obtained by the use of and I prefer to use di-salicylal ethylene diamine (which may be obtained commercially from E. I. du Pont de Nemours & Co., Inc., of Wilmington, Delaware, under the name of "du Pont Copper Inhibitor X-872.") While the amount of copper inhibitor which is used may vary considerably, I prefer to use around 0.005% by weight of the ink. Excellent results have been obtained however by using from around 0.0025% to around 0.05%. Another material which may be employed as a copper inhibitor is di-salicylal-o-phenylene diamine.

The incorporation of the copper inhibitor as an ingredient in the ink permits the use of the copper-compound containing ink in all ordinary types of fountain pens including those having ink reservoir sacs, or other parts, such as filling diaphragms, pistons, etc. formed from rubber containing known anti-oxidants, without undue deterioration of the rubber. The copper inhibitor is effectively distributed through the ink and thus is in condition to exercise its inhibiting effect on any free copper or copper compound in the ink at any point at which the ink may contact the rubber material. The copper inhibitor is carried into any and all portions of the pen into which the ink may penetrate and contact the rubber. Moreover, the copper inhibitor is always available so long as any ink remains in the pen and a new supply is made available each time the pen is refilled. Thus, there is no danger of exhaustion of the material, or such depletion as would undesirably diminish the protective effect thereof, even with repeated emptying and refilling of the pen, or upon cleaning of the pen by flushing the interior with water.

The copper inhibitor may be employed in any one of a large number of different types of inks. As will be understood, it is especially advantageous to use it in inks containing as a dye a copper compound since such dyes often contain free copper which is a highly active catalyzer of deterioration. However, it has been found desirable to incorporate the copper inhibitor in other inks which do not contain copper compound dyes, since it is often found that copper or copper compounds may be present as impurities resulting from manufacture of the ink or constituents thereof.

The following is a specific example of an ink compounded in accordance with my invention although it will be understood that the invention is not limited thereto:

An excellent ink of brilliant color having excellent fastness and rapid penetration of writing papers may be formed by dissolving as a dye an amide of copper phthalocyanine sulfonate in an aqueous solution of a water-soluble metal hydroxide, such as caustic soda, with a small quantity of a copper inhibitor, such as di-salicylal ethylene diamine. Other ingredients preferably are included to impart desirable characteristics to the ink such as a flow promoter which imparts a free flowing quality to the ink and a humectant which inhibits drying of the ink at the pen nib. One typical formula of my ink is as follows, with both the preferred quantities and the preferred range of quantities given:

| | Quantity | Range |
|---|---|---|
| Ink Greenish Blue 5414-D Paste (25% tinctorial strength) (N-diethanol copper phthalocyanine sulfonamide, commercially obtainable from General Dyestuff Corp. of New York, N. Y. under the foregoing name) | 116 lbs | 82–140 lbs. |
| Flake Caustic Soda | 12 lbs. 8 oz. | 8–20 lbs. |
| Di-salicylal ethylene diamine (commercially obtainable from E. I. du Pont de Nemours & Co., Inc. of Wilmington, Delaware, under the name "du Pont Copper Inhibitor X-872") | 20 gms | 10–100 gms. |
| Di-ethyl cyclohexylamine lauryl sulfate (commercially obtainable from E. I. du Pont de Nemours & Co., Inc. of Wilmington, Delaware, under the name "Duponal G") | 35 gms | 10–50 gms. |
| Ethylene glycol | 1 gal. (U. S.). | ½–3 gals. (U. S.). |
| Water, sufficient to make | 100 gals. U. S.). | 100 gals. (U. S.). |

Other excellent inks may be made using other dyes, as for example other amides or sulfonamides of copper phthalocyanine sulfonate, such as N-isopropyl copper phthalocyanine sulfonamide, N-ethyl copper phthalocyanine sulfonamide, N-methyl copper phthalocyanine sulfonamide, N-o-dianisidine copper phthalocyanine sulfonamide, or N-beta-aminoethylene copper phthalocyanine sulfonamide, and using as an alkali other metallic water soluble hydroxides such as potassium hydroxide, lithium hydroxide, cesium hydroxide or rhubidium hydroxide. Also, di-salicylal-o-phenylene diamine may be used with any of the dyes herein disclosed, in lieu of di-salicylal ethylene diamine.

I claim:

1. A writing ink consisting essentially of, in water solution, a dye selected from the group consisting of N-diethanol copper phthalocyanine sulfonamide, N-isopropyl copper phthalocyanine sulfonamide, N-ethyl copper phthalocyanine sulfonamide, N-methyl copper phthalocyanine sulfonamide, N-o-dianisidine copper phthalocyanine sulfonamide and N-beta-aminoethylene copper phthalocyanine sulfonamide, and di-salicylal ethylene diamine.

2. A writing ink consisting essentially of, in water solution, a copper phthalocyanine sulfonamide dye, a water soluble metal hydroxide and di-salicylal ethylene diamine.

3. A writing ink consisting essentially of, in water solution, a dye selected from the group consisting of N-diethanol copper phthalocyanine sulfonamide, N-isopropyl copper phthalocyanine sulfonamide, N-ethyl copper phthalocyanine sulfonamide, N-methyl copper phthalocyanine sulfonamide, N-o-dianisidine copper phthalocyanine sulfonamide and N-beta-aminoethylene copper phthalocyanine sulfonamide, di-salicylal ethylene diamine, a water soluble metal hydroxide, ethylene glycol and di-ethyl cyclohexylamine lauryl sulfate.

4. A writing ink consisting essentially of, in water solution, a dye selected from the group consisting of N-diethanol copper phthalocyanine sulfonamide, N-isopropyl copper phthalocyanine sulfonamide, N-ethyl copper phthalocyanine sulfonamide, N-methyl copper phthalocyanine sulfonamide, N-o-dianisidine copper phthalocyanine sulfonamide and N-beta-aminoethylene copper phthalocyanine sulfonamide, and from around 0.0025% to around 0.05% by weight of di-salicylal ethylene diamine.

5. A writing ink consisting essentially of, in water solution, a dye selected from the group consisting of N-diethanol copper phthalocyanine sulfonamide, N-isopropyl copper phthalocyanine sulfonamide, N-ethyl copper phthalocyanine sulfonamide, N-methyl copper phthalocyanine sulfonamide, N-o-dianisidine copper phthalocyanine sulfonamide and N-beta-aminoethylene copper phthalocyanine sulfonamide, and di-salicylal-o-phenylene diamine.

6. A writing ink consisting essentially of, in water solution, a copper phthalocyanine dye, and a copper inhibitor consisting of a material selected from the group consisting of di-salicylal ethylene diamine and di-salicylal-o-phenylene diamine.

7. A writing ink consisting essentially of, in water solution, a copper phthalocyanine dye, a water soluble metal hydroxide, ethylene glycol, di-ethyl cyclohexylamine lauryl sulfate, and di-salicylal-o-phenylene diamine.

8. A writing ink consisting essentially of, in water solution, the following:

| | |
|---|---|
| N-diethanol copper phthalocyanine sulfonamide (25% tinctorial strength) | 82–140 lbs. |
| Flake caustic soda | 8–20 lbs. |
| Di-salicylal ethylene diamine | 10–100 gms. |
| Di-ethyl cyclohexylamine lauryl sulfate | 10–50 gms. |
| Ethylene glycol | ½–3 gals. (U. S.) |
| Water, sufficient to make | 100 gals. (U. S.) |

GALEN H. SAYLER.

REFERENCES CITED

The following references are of record in the file of this patent:

UNITED STATES PATENTS

| Number | Name | Date |
|---|---|---|
| 2,086,745 | Sell | July 13, 1937 |
| 2,173,699 | Siegel | Sept. 19, 1939 |
| 2,181,122 | Downing | Nov. 28, 1939 |
| 2,282,513 | Downing | May 12, 1942 |
| 2,306,863 | Bour | Dec. 29, 1942 |
| 2,352,164 | Burnham | June 27, 1944 |
| 2,375,230 | Kline | May 8, 1945 |
| 2,413,224 | Fox | Dec. 24, 1946 |